(12) United States Patent
Tomasi Canovo

(10) Patent No.: US 9,709,097 B2
(45) Date of Patent: Jul. 18, 2017

(54) CAGE FOR BALL BEARINGS

(71) Applicant: Angelo Tomasi Canovo, Pinerolo (IT)

(72) Inventor: Angelo Tomasi Canovo, Pinerolo (IT)

( * ) Notice: Subject to any disclaimer, the term of this patent is extended or adjusted under 35 U.S.C. 154(b) by 0 days.

(21) Appl. No.: 14/895,568

(22) PCT Filed: Jun. 4, 2014

(86) PCT No.: PCT/IB2014/061945
§ 371 (c)(1),
(2) Date: Dec. 3, 2015

(87) PCT Pub. No.: WO2014/203103
PCT Pub. Date: Dec. 24, 2014

(65) Prior Publication Data
US 2016/0102709 A1    Apr. 14, 2016

(30) Foreign Application Priority Data

Jun. 5, 2013 (IT) ................ TO2013A0464

(51) Int. Cl.
*F16C 33/42* (2006.01)
*F16C 33/38* (2006.01)
*F16C 33/44* (2006.01)
*F16C 33/66* (2006.01)
*F16C 19/06* (2006.01)

(52) U.S. Cl.
CPC ........ *F16C 33/427* (2013.01); *F16C 33/3868* (2013.01); *F16C 33/3887* (2013.01); *F16C 33/44* (2013.01); *F16C 33/6614* (2013.01); *F16C 33/6651* (2013.01); *F16C 19/06* (2013.01); *F16C 2204/14* (2013.01); *F16C 2204/62* (2013.01); *F16C 2226/52* (2013.01); *F16C 2226/54* (2013.01); *F16C 2226/76* (2013.01)

(58) Field of Classification Search
CPC .. F16C 33/3868; F16C 33/3887; F16C 33/44; F16C 33/427; F16C 33/6614; F16C 2204/60; F16C 2226/54; F16C 2226/76; F16C 33/6651; F16C 2204/10; F16C 2240/60
USPC ....... 384/470, 516, 523, 527, 529, 530–531, 384/537, 614
See application file for complete search history.

(56) References Cited

U.S. PATENT DOCUMENTS 1,494,012 A * 5/1924 Parsons ................ F16C 33/427
384/530
1,814,993 A 7/1931 Wickland
(Continued)

FOREIGN PATENT DOCUMENTS

GB    555519 A * 8/1943 ............ F16C 33/427
GB    725682 A * 3/1955 ............... B21K 1/05
(Continued)

*Primary Examiner* — Marcus Charles
(74) *Attorney, Agent, or Firm* — Howson & Howson, LLP

(57) ABSTRACT

Half-cage for forming cages (10) for ball bearings, in which the half-cages (11, 21) comprise semi-spherical recesses (12, 22) arranged at predefined intervals along a circumference. The semi-spherical recesses are spaced out from each other by means of respective planar portions (14, 24), are arranged along the circumference, and comprise at least one rib (31, 41) having a certain width and extending along the circumference over at least the whole surface of said recesses.

13 Claims, 6 Drawing Sheets

(56) References Cited

U.S. PATENT DOCUMENTS

| | | | |
|---|---|---|---|
| 2,783,104 A | | 2/1957 | Anderson |
| 3,510,185 A | * | 5/1970 | McKee ................. F16C 23/086 |
| | | | 384/497 |
| 3,539,231 A | | 11/1970 | Langstrom et al. |
| 3,586,405 A | * | 6/1971 | Claesson ............. F16C 33/3875 |
| | | | 384/526 |
| 3,644,971 A | * | 2/1972 | Axbard ................. B21D 53/12 |
| | | | 29/898.067 |
| 5,044,783 A | * | 9/1991 | Willner ............... F16C 33/3887 |
| | | | 384/523 |
| 5,806,990 A | * | 9/1998 | Ueno ................. F16C 33/3887 |
| | | | 384/470 |
| 6,010,248 A | * | 1/2000 | Ueno ....................... F16C 33/30 |
| | | | 384/492 |
| 8,727,631 B2 | * | 5/2014 | Wakuda ............. F16C 33/3887 |
| | | | 384/482 |
| 9,027,904 B2 | * | 5/2015 | Najmolhoda ........... F16K 31/06 |
| | | | 251/129.08 |
| 2008/0187263 A1 | * | 8/2008 | Spielfeld ................. F16C 25/08 |
| | | | 384/523 |
| 2009/0290826 A1 | * | 11/2009 | Pecher ................. F16C 33/427 |
| | | | 384/527 |
| 2011/0069918 A1 | | 3/2011 | Wakuda et al. |
| 2012/0051680 A1 | | 3/2012 | Ishikawa et al. |
| 2014/0348454 A1 | * | 11/2014 | Ueno ................. F16C 33/3875 |
| | | | 384/480 |

FOREIGN PATENT DOCUMENTS

| | | | | |
|---|---|---|---|---|
| JP | 2008208994 A | * | 9/2008 | |
| JP | 2008-298256 A | | 12/2008 | |
| JP | 2012047197 A | * | 3/2012 | |
| JP | 5602345 B2 | * | 10/2014 | |

\* cited by examiner

CAGE FOR BALL BEARINGS

CROSS REFERENCE TO RELATED APPLICATIONS

This application is the National Stage of International Application No. PCT/IB2014/061945, filed Jun. 4, 2014, which claims the benefit under 35 USC 119 of Italian Application No. TO2013A000464, filed Jun. 5, 2013.

TECHNICAL FIELD

The present invention generally relates to a cage for a ball bearing and to a first half-cage arranged to be fastened in face-to-face relationship with a second half-cage to form the cage of a ball bearing.

PRIOR ART

Cages and half-cages for ball bearings are well known.

Prior art cages are made by assembling together two half-cages, preferably identical and having each semi-spherical recesses arranged at predetermined intervals along a circumferential direction and spaced out from each other by means of respective planar portions.

In use, the planar portions are coupled and fastened together so as to enclose the balls of the ball bearing in the recesses and to form the cage for the ball bearing.

Patent document EP_2287481 discloses, inter alia, a cage for ball bearings where the half-cages include, in correspondence of the semi-spherical recesses, partial, non-contact portions arranged, in use, to remain out of contact of the balls, so as to reduce the contact surface with the balls by from 15% to 30%. The partial portions provided in such a prior art extend over only part of the semi-spherical recesses and are intended, in use, to improve some mechanical characteristics of the cage, e.g. to reduce ball friction with the cage surface and to optimise ball rolling in the cage of the bearing.

Document JP 2008 298256 A discloses a cage for ball bearings consisting of two half-cages coupled through rivets. The half-cages have semi-circular portions arranged along a circumferential direction and spaced out by means of planar portions. Each half-cage is equipped with one or two flanges positioned on the outer rim of the half-cages.

The Applicant however has realised that the prior art, while providing indications in order to improve some mechanical characteristics of the cages, fails to provide indications for solving a more and more felt need concerning aspects of material consumption and energy consumption associated with material consumption.

Indeed, the Applicant has realised that the need of optimising, i.e. reducing, the use of material for making the half-cages and consequently the cages for ball bearings, for the same mechanical characteristics, appeared from many sides.

DESCRIPTION OF THE INVENTION

The technical problem the invention aims at solving is obtaining, jointly with an optimisation of the ball friction inside the cage of the bearing, also a significant reduction in the amount of material used for making the half-cages and consequently the cages for ball bearings, Such a technical problem is solved by the cages and the half-cages having the features set forth in the appended claims.

The claims are integral part of the technical teaching provided herein in respect of the invention.

The following synthetic description of the invention is provided in order to allow a basic understanding of some aspects of the invention. Such a synthetic description is not a thorough description and, as such, it is not to be intended as being suitable for identifying key or critical elements of the invention or for defining the scope of the invention. It is only aimed at setting forth some concepts of the invention in simplified form, as an anticipation of the detailed description below.

In accordance with a feature of a preferred embodiment, each half-cage has a plurality of recesses spaced out by means of planar portions and arranged along a circumference, and the recesses comprise at least one rib having a certain width and extending over at least the whole surface of the recesses provided in the half-cages.

In accordance with another feature of the present invention, the ribs extend also along the planar portions.

In accordance with a further feature of the present invention, in correspondence of the planar portions, the ribs merge into the surfaces of the planar portions at clear areas provided in the planar portions.

BRIEF DESCRIPTION OF THE FIGURES

The above and other features and advantages of the invention will become apparent from the following description of preferred embodiments made by way of non limiting example with reference to the accompanying Figures, in which elements denoted by a same or similar numerical reference correspond to elements having the same or similar function and construction and in which.

DESCRIPTION OF PREFERRED EMBODIMENTS

Figure 1:
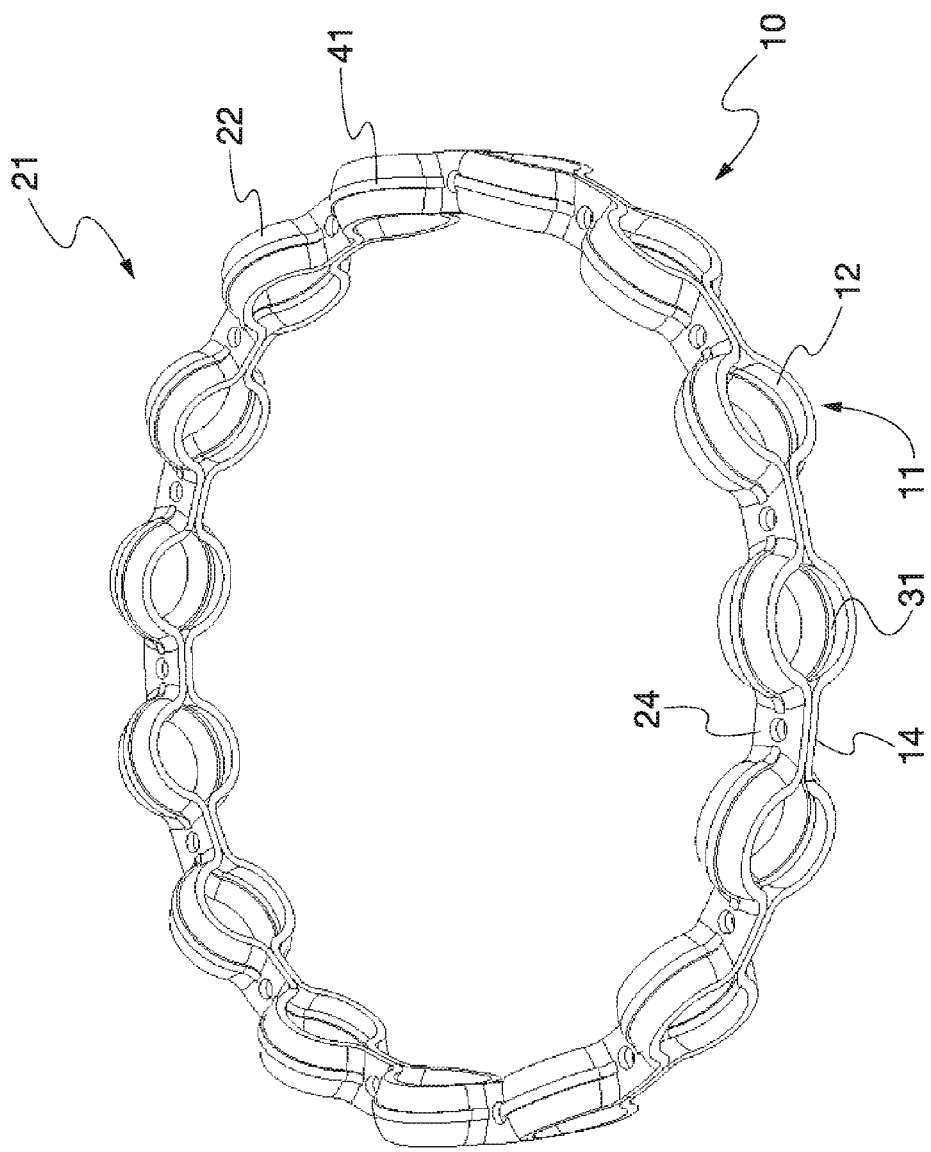
FIG. 1 is a general view of a cage for ball bearings.

Referring to FIG. 1, a cage for ball bearings (cage) 10 in accordance with exemplary embodiments considered as preferred, comprises a first and a second half-cage, or upper and lower half-cage, 11, 21, which are made of a material with a given thickness 19, 29 and have each semi-spherical recesses 12, 22 arranged at predetermined intervals along a circumference.

The material the half-cages are made of may be for instance a soft steel with low and/or very low carbon content, suitable for all kinds of cold forming (from bending to very deep pressing), such as for instance a steel of a kind according to standards DIN 1614, UNI EN 10139, UNI EN 10130, AISI 1008 or AISI 1010.

Steels of such kind generally have similar mechanical characteristics independently of the standard.

In particular, the steel the cages are to be made of has mechanical characteristics of Resiliency (Re) and Mechanical Breaking Strength (MS) as shown in the following table 1.

TABLE 1

| Re min | Re max | MS min | MS max |
| --- | --- | --- | --- |
| 140 N/mm$^2$ | 280 N/mm$^2$ | 270 N/mm$^2$ | 410 N/mm$^2$ |

In accordance with other embodiments, the half-cages may also be made, for instance, of stainless steel of a type according to standard UNI EN 10188-1 or UNI EN 10188-2.

In accordance with yet other embodiments, the half-cages may be made of brass, for instance brass according to standard UNI EN 1652.

Semi-spherical recesses 12, 22 (FIG. 1-FIG. 5) in each half-cage are spaced out from each other by means of respective planar portions 14, 24, and respective connecting surfaces 34, 44 having a given radius are provided in order to connect recesses 12, 22 with the respective planar portions 14, 24.

In accordance with the preferred embodiment, planar portions 14, 24 include respective through-holes 15, 25. The planar portions and the through-holes are arranged to allow fastening the facing half-cages, for instance by means of rivets 18 of known type.

Figure 6:
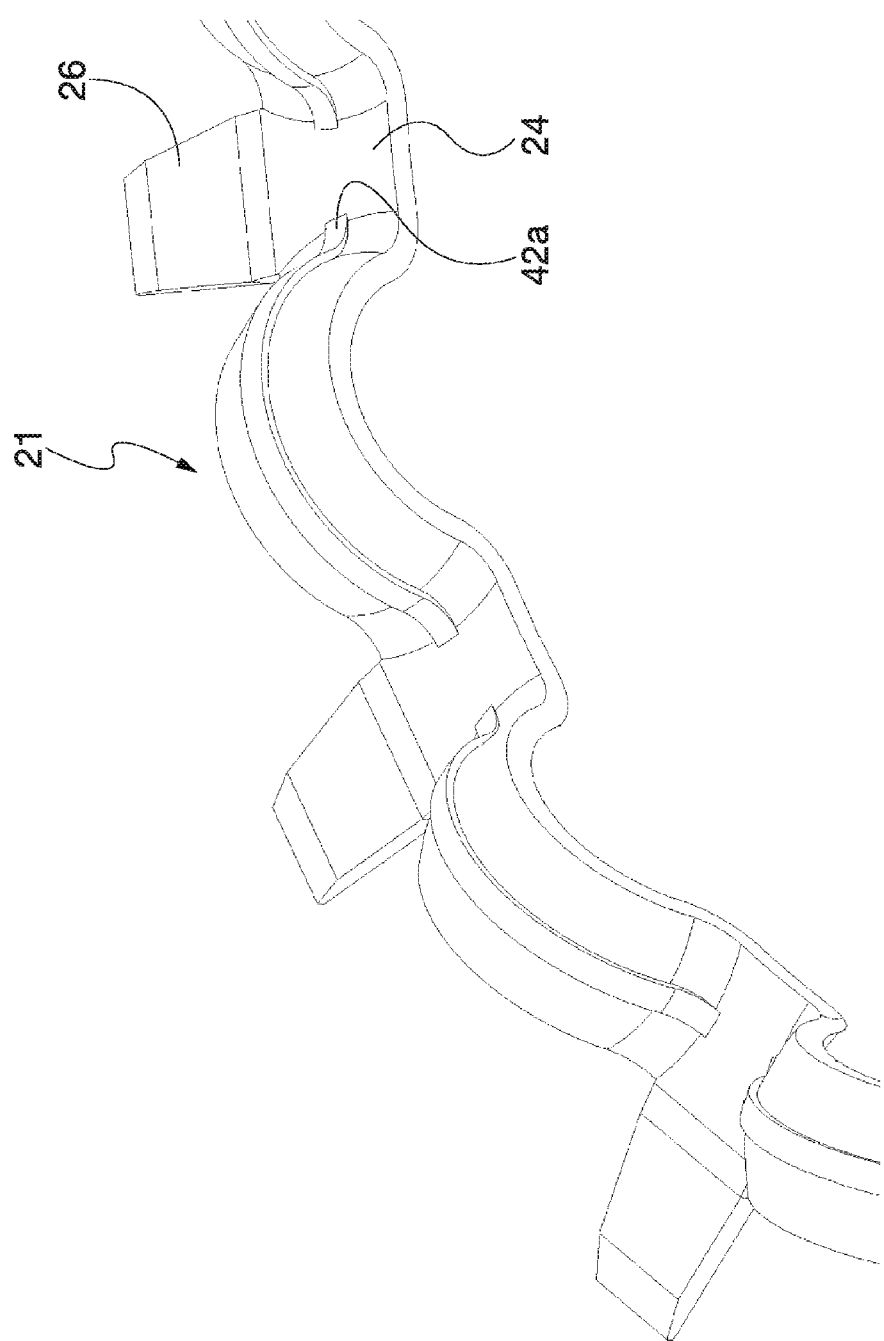
FIG. 6 shows a further example of a half-cage.

In accordance with other embodiments, rivets 18 may be replaced by tongues 26 (FIG. 6) provided on one of the half-cages, for instance the second or upper half-cage 21.

Such tongues 26 are folded, in known manner, over the planar portions of the lower half-cage so as to form, in use, the cage according to the present invention.

In accordance with such an embodiment, the rib(s) is (are) preferably provided also in planar portion 24 of lower half-cage 21.

In accordance with the preferred embodiment (FIG. 1-FIG. 5), half-cages 11, 21 are identical and are coupled so that semi-spherical recesses 12, 22, in use, face each other so as to form respective seats for the balls of the ball bearing.

In accordance with such an embodiment, each half-cage 11, 21 includes a central rib 31, 41 extending over the whole recesses 12, 22 as far as planar portions 14, 24, including connecting surfaces 34, 44.

More particularly, in accordance with the preferred embodiment, the rib extends along planar portions 14, 24, with the only exclusion, for instance, of clear areas 38, 48 arranged to allow fastening half-cages 11, 21 by means of rivets 18.

In accordance with other embodiments, each rib 31, 41 extends at least along the whole recess circumference and, preferably, at least over connecting surfaces 34, 44.

Figure 2:
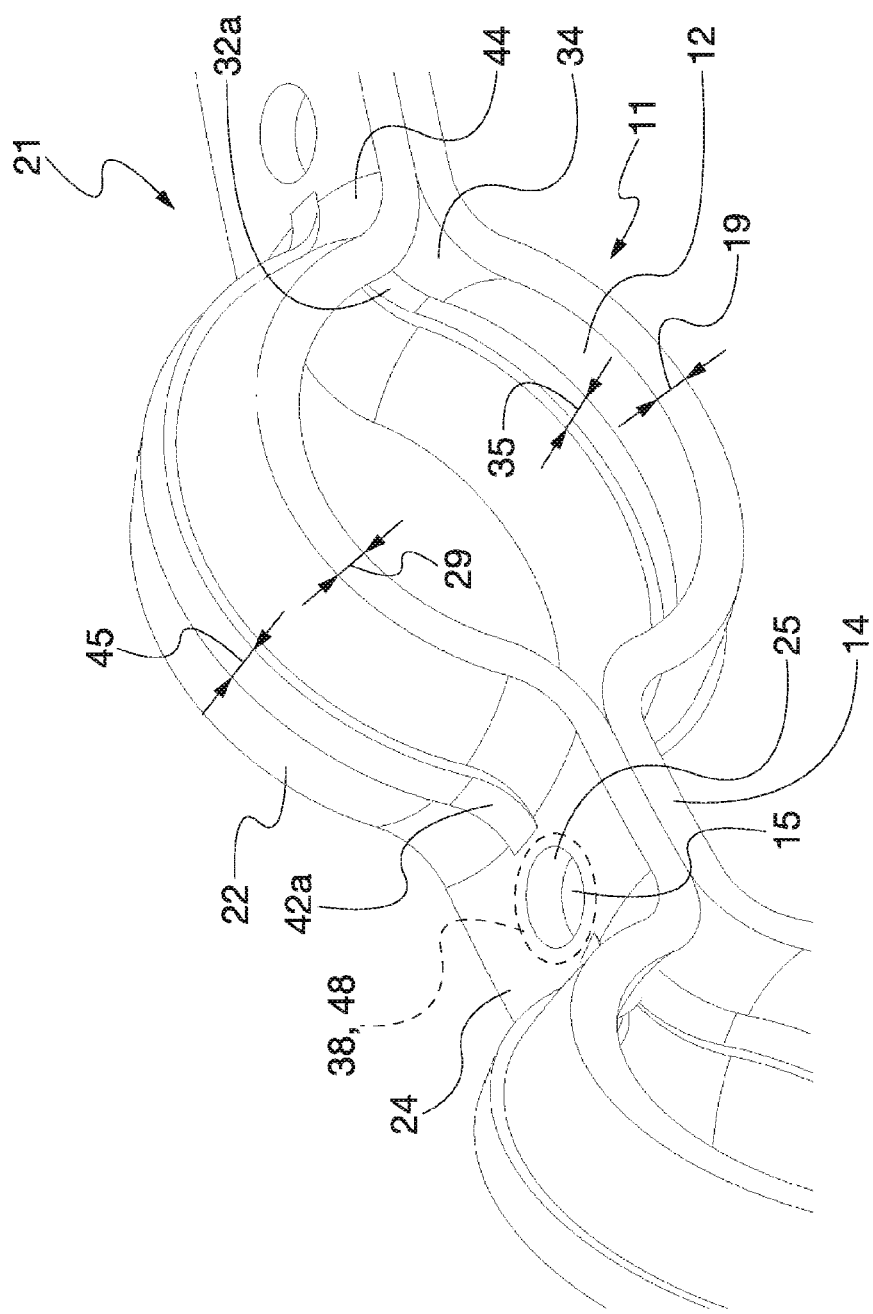
FIGS. 2 and 3 show a first example of half-cages made in accordance with the present invention.
Figure 3:
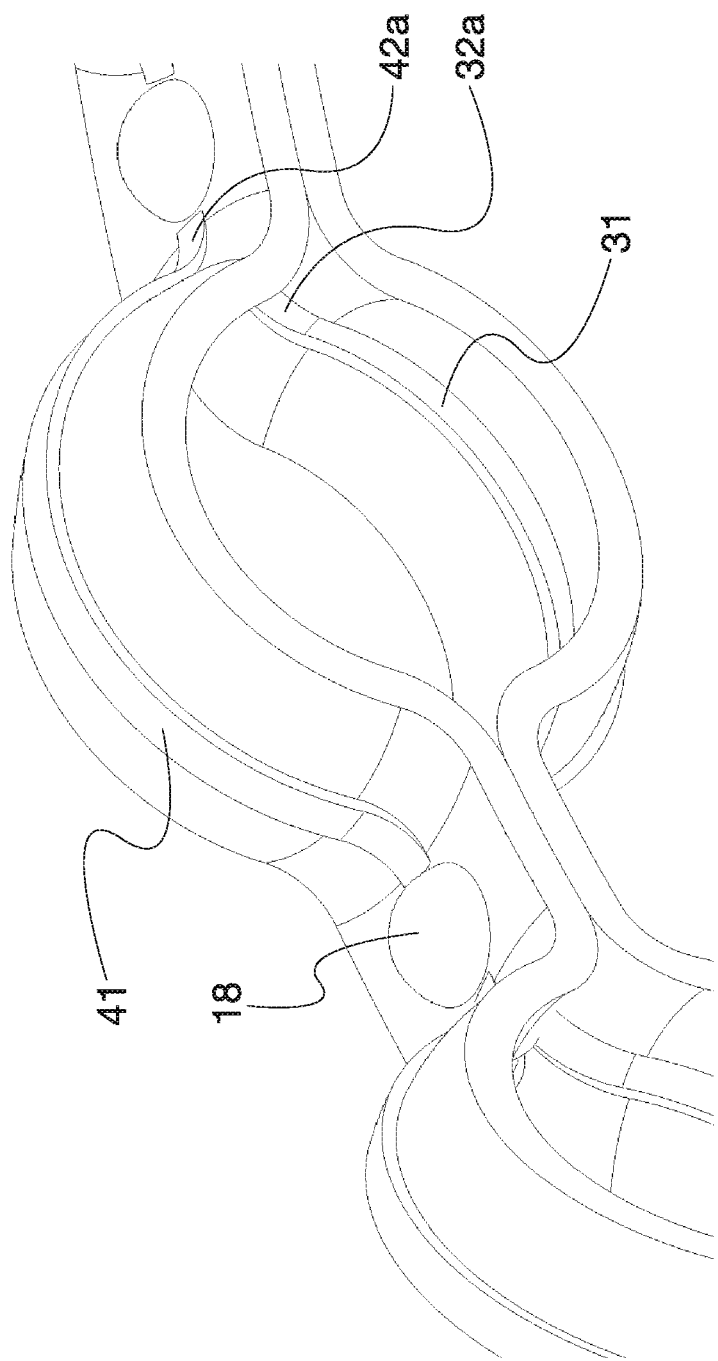

Ribs 31, 41 have a given width 35, 45 and, preferably, they are configured, in correspondence of planar portions 14, 24, so as to form a portion 32a, 42a merging into the surface of planar portions 14, 24 (FIG. 1-FIG. 3).

Figure 4:
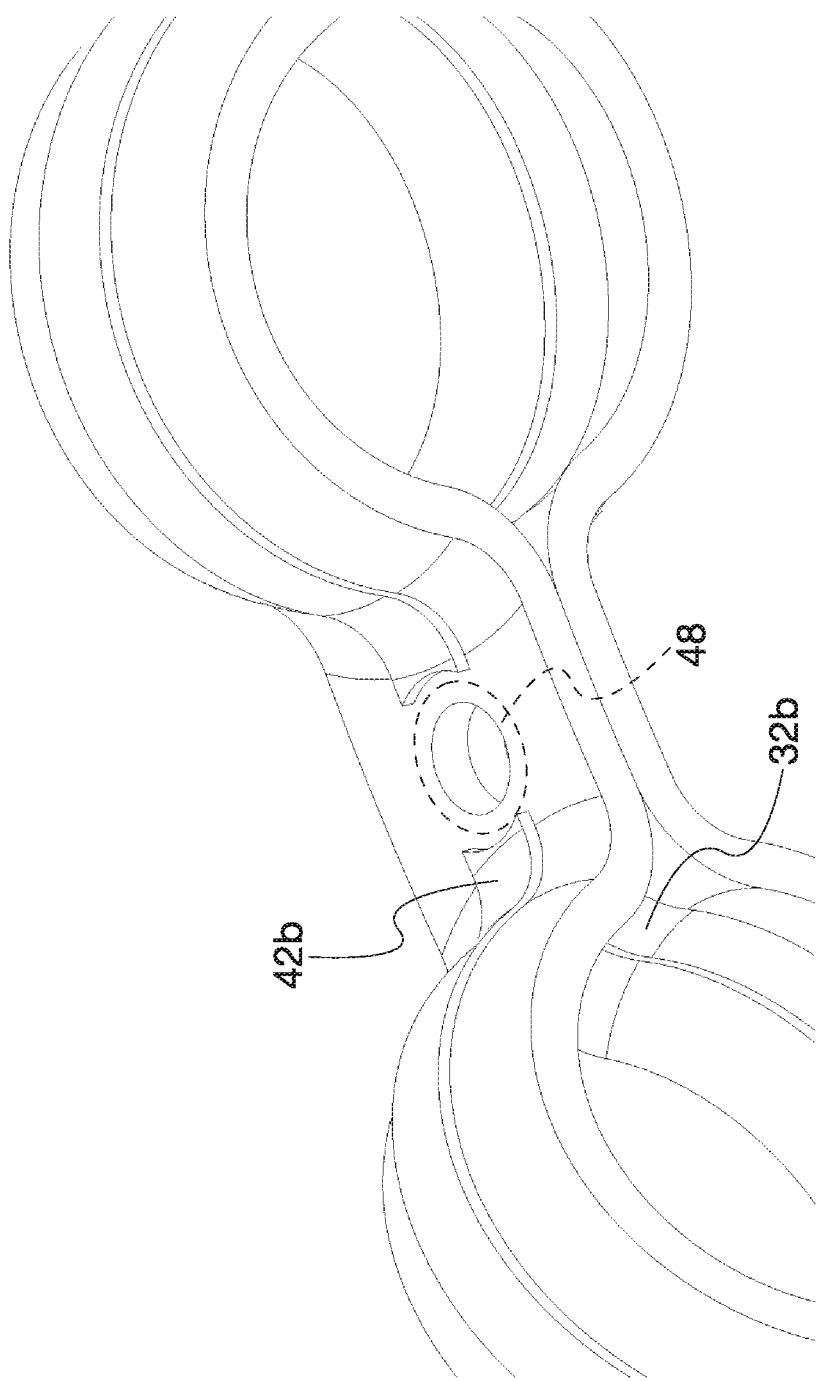
FIGS. 4 and 5 show a second example of half-cages made in accordance with the present invention.
Figure 5:
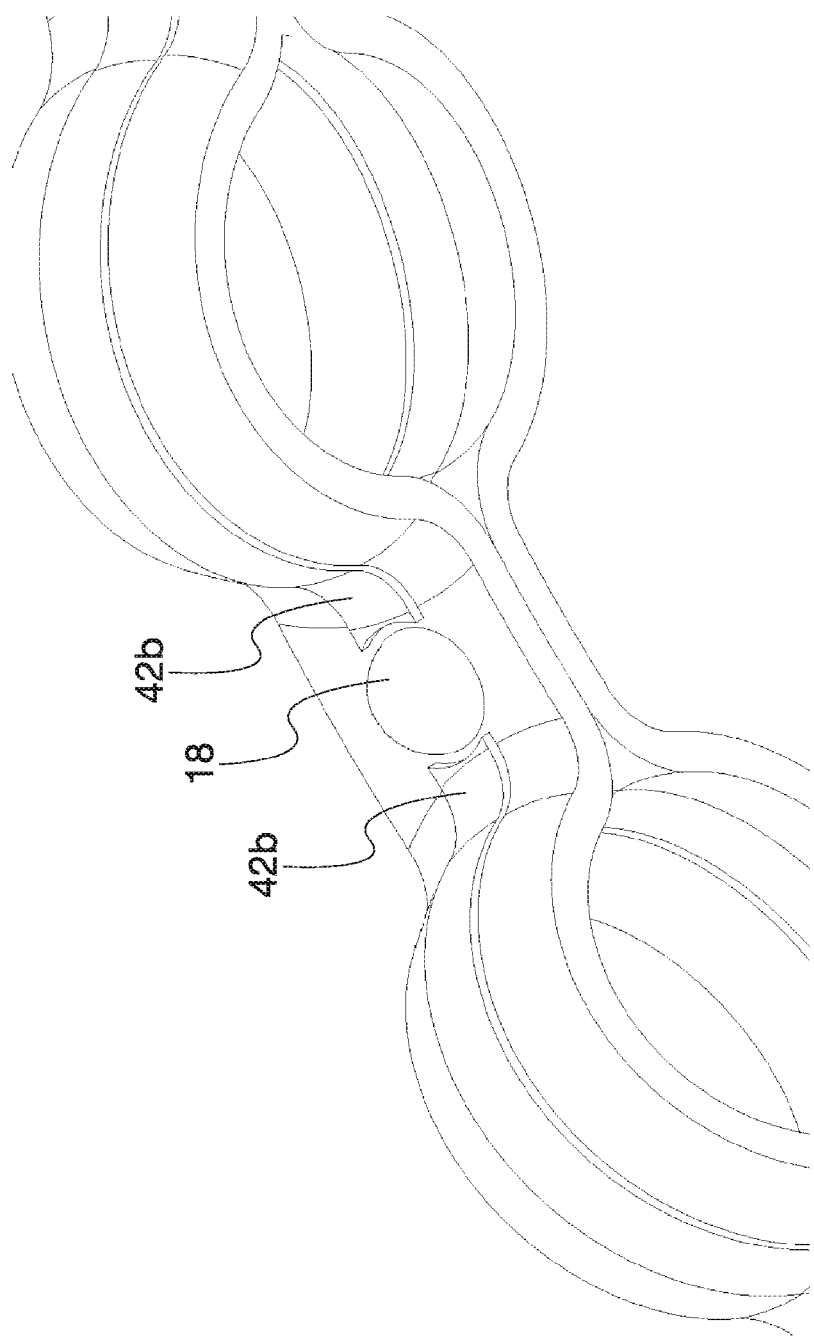

In accordance with a variant of the preferred embodiment, the ribs are configured so as to form a step 32b, 42b in correspondence of clear areas 38, 48 (FIG. 4-FIG. 5).

Embodiments are also possible where one half-cage has a connection of the kind as shown in FIG. 2 and the other one a connection of the kind as shown in FIG. 4.

In accordance with other embodiments, the central rib is replaced by a plurality of ribs extending at least over the whole recesses 12, 22 and, preferably, at least over connecting surfaces 34, 44.

As known, the cages of the bearings must have a given stiffness, which is measured in $(N \times mm^3)/mm^2$. Said stiffness is measured in known manner by practical tests on linear sheets made of a given material and is then simulated, for the same kind and thickness of the material, for the half-cages.

By using the aforementioned process, the Applicant has realised, through a suitable experimentation, that the provision of the rib in correspondence of recesses 12, 22 and in correspondence of planar portions 14, 24, with the only exclusion of clear areas 38, 48 provided for rivets 18, allows attaining advantages that at first sight cannot be foreseen.

In conducting the experimental tests, the Applicant has taken as a reference linear bars 0.8 mm thick without ribs and bars 0.7 mm thick with ribs 0.2 mm and 0.25 mm, and bars 0.65 mm thick with ribs 0.2 mm, 0.25 mm and 0.3 mm, and then has obtained the stiffness values of the half-cages by simulation, as reported in table 2.

The results of the simulations show that the provision of the ribs allows increasing the stiffness of the half-cages and simultaneously reducing the thickness of the material being used.

In the calculations and the simulations, a stiffness value of about 240.000 $(N \times mm^3)/mm^2$ has been taken as a reference, said value been considered as an acceptable minimum value for cages 10 formed by half-cages 11, 21 made in accordance with the prior art and of one of the above materials having for instance thicknesses 19, 29 of 0.8 mm.

Moreover, in performing the simulations, average values obtained from the values of Resiliency (Re) and Mechanical Strength (MS) reported in table 1, i.e. values Re=210 $N/mm^2$ and MS=340 $N/mm^2$, have been taken as a reference.

TABLE 2

| Thickness of the material mm (19, 29) | Rib mm (35, 45) | Stiffness $(N \times mm^3)/mm^2$ |
| --- | --- | --- |
| 0.8 | No rib | 239867 |
| 0.7 | 0.2 | 242942 |
| 0.7 | 0.25 | 254759 |
| 0.65 | 0.2 | 225614 |
| 0.65 | 0.25 | 237708 |
| 0.65 | 0.3 | 250569 |

From the checks performed by taking as a reference, for instance, a material made of a soft steel with low and/or very low carbon content, for instance the material according to standard UNI EN 10139, and half-cages 11, 21 with thicknesses 19, 29 ranging, in accordance with the prior art, from 0.4 to 1.0 mm, the Applicant has realised that the provision of the ribs along the whole surfaces of the recesses so as to include also the planar portions, allows reducing, for the same material, the half-cage thicknesses 19, 29 by at least from 15% to 20%.

The thickness reduction results, as it can be readily understood, in a corresponding material saving of from 15% to 20%.

The Applicant has also realised that the provision of the ribs improves, in use, also ball rolling and lubrication in the ball bearing.

In synthesis, the provision of at least one central rib 31 and 41 along the surface of the half-cages allows reducing the amount of material required for their manufacture without negatively affecting their stiffness characteristics.

The saving of material results of course in a lower energy waste.

Moreover, advantageously, the provision of at least one central rib allows improving, in use, the lubrication of the bearing over the prior art, since lubricant allocation and rearrangement in the region of recesses 12, 22 takes place.

Furthermore, the provision of the rib allows, in use, reducing the contact surface between the balls and the recesses, with a consequent reduction in the friction between the balls and the cage and a reduction of the forces required for making the balls roll in the bearing.

Of course, obvious changes and modifications to the above description in respect of the sizes, the shapes, the materials and the components are possible without departing from the invention as defined in the following claims.

The invention claimed is:

1. A half-cage for ball bearings, comprising
semi-spherical recesses arranged at predefined intervals along a circumference, said semi-spherical recesses being spaced out from each other by way of respective planar portions;
wherein said recesses, arranged along the circumference, comprise
at least one central rib having a certain width, which rib extends along the circumference over at least the whole surface of said recesses and along each of said planar portions and merges into the surface of each of said planar portions next to clear areas provided in said planar portions.

2. The half-cage according to claim 1, wherein the planar portions comprise through-holes.

3. The half-cage according to claim 2, wherein the mechanical stiffness of the half-cage is directly proportional to the width of said at least one rib.

4. The half-cage according to claim 1, wherein said half-cage is made of brass.

5. The half-cage according to claim 1, wherein the mechanical stiffness of the half-cage is directly proportional to the width of said at least one rib.

6. A cage for ball bearings, comprising
a first half-cage and a second half-cage, each of said first half-cage and said second half-cage comprises semi-spherical recesses arranged at predefined intervals along a circumference, said semi-spherical recesses being spaced out from each other by way of respective planar portions, and each of said recesses include at least one central rib having a certain width, which rib extends along the circumference over at least the whole surface of said recesses and along each of said planar portions and merges into the surface of each of said planar portions next to clear areas provided in said planar portions,
wherein the first and the second half-cages are coupled together such that the semi-spherical recesses of said first half-cage face the semi-spherical recesses of said second half-cage and the planar portions of said first half-cage face the planar portions of said second half-cage.

7. The cage for ball bearings according to claim 6, wherein the planar portions of the first and second half-cages are fastened to each other by way of rivets passing through through-holes formed in the planar portions of the first and second half-cages.

8. The cage for ball bearings according to claim 7, wherein the ribs provided on said first and second half-cages extend along said planar portions and merge into the surfaces of said planar portions next to corresponding clear areas provided for said fastening rivets.

9. The cage for ball bearings according to claim 7, wherein each of the first and second half-cages is made of a material having a certain thickness and wherein the ribs of the first and second half-cages are arranged to give to the cage a mechanical stiffness corresponding to that of another cage formed by half-cages without ribs made of said material but with a different thickness, said certain thickness being at least 15% smaller than said different thickness.

10. The cage for ball bearings according to claim 8, wherein each of the first and second half-cages is made of a material having a certain thickness and wherein the ribs of the first and second half-cages are arranged to give to the cage a mechanical stiffness corresponding to that of another cage formed by half-cages without ribs made of said material but with a different thickness, said certain thickness being at least 15% smaller than said different thickness.

11. The cage for ball bearings according to claim 6, wherein on one of the first and second half-cages, next to each planar portion, fastening tongues are provided that are arranged to be folded over the planar portions of the other half-cage.

12. The cage for ball bearings according to claim 11, wherein each of the first and second half-cages is made of a material having a certain thickness and wherein the ribs of the first and second half-cages are arranged to give to the cage a mechanical stiffness corresponding to that of another cage formed by half-cages without ribs made of said material but with a different thickness, said certain thickness being at least 15% smaller than said different thickness.

13. The cage for ball bearings according to claim 6, wherein each of the first and second half-cages is made of a material having a certain thickness and wherein the ribs of the first and second half-cages are arranged to give to the cage a mechanical stiffness corresponding to that of another cage formed by half-cages without ribs made of said material but with a different thickness, said certain thickness being at least 15% smaller than said different thickness.

* * * * *